(12) United States Patent
Belvedere et al.

(10) Patent No.: US 10,230,295 B2
(45) Date of Patent: Mar. 12, 2019

(54) SWITCHING SIGNAL GENERATING APPARATUS AND METHOD

(71) Applicant: GM GLOBAL TECHNOLOGY OPERATIONS LLC, Detroit, MI (US)

(72) Inventors: Tiziana Belvedere, Turin (IT); Angelo Argento, Turin (IT); Stefano Nieddu, Turin (IT)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 15/658,093

(22) Filed: Jul. 24, 2017

(65) Prior Publication Data
US 2019/0028088 A1 Jan. 24, 2019

(51) Int. Cl.
*H02M 1/08* (2006.01)
*H02M 1/16* (2006.01)

(52) U.S. Cl.
CPC .............. *H02M 1/08* (2013.01); *H02M 1/16* (2013.01)

(58) Field of Classification Search
CPC ................................. H02M 1/08; H02M 1/16
See application file for complete search history.

(56) References Cited

U.S. PATENT DOCUMENTS

| | | | | |
|---|---|---|---|---|
| 2008/0252277 | A1* | 10/2008 | Sase | H02M 3/157 323/283 |
| 2009/0230930 | A1* | 9/2009 | Jain | H02M 3/1588 323/234 |
| 2014/0217996 | A1* | 8/2014 | Peker | H02M 3/1582 323/271 |
| 2015/0171744 | A1* | 6/2015 | Fabbro | H02M 3/1582 323/234 |
| 2017/0093296 | A1* | 3/2017 | Chen | H02M 1/088 |
| 2017/0094735 | A1* | 3/2017 | Tanaka | H05B 33/0815 |
| 2017/0257031 | A1* | 9/2017 | Shao | H02M 3/1582 |
| 2017/0317580 | A1* | 11/2017 | Lyles | H02M 3/04 |
| 2018/0083533 | A1* | 3/2018 | Price | H02M 3/158 |

* cited by examiner

*Primary Examiner* — Thomas J. Hiltunen
(74) *Attorney, Agent, or Firm* — Lorenz & Kopf, LLP (57) ABSTRACT

Methods and apparatus are provided for a high current control strategy and a low current control strategy using fixed threshold values and variable threshold values. An electrical quantity related to an electrical current which is to be switched is received on an input. The electrical quantity related to the electrical current is compared with a predefined first fixed threshold value in a first comparator for determining a first logical state. The electrical quantity is compared with a first variable threshold value in a second comparator for determining a second logical state. The electrical current is switched between an ON state and an OFF state in response to a switching signal on an output terminal when the electrical quantity of the electrical current meets the first variable threshold value. The first logical state, the second logical state and the switching signal provided at the output terminal vary the first variable threshold value.

17 Claims, 5 Drawing Sheets

SWITCHING SIGNAL GENERATING APPARATUS AND METHOD

TECHNICAL FIELD

The present disclosure generally relates to the field of automotive engine control, and more particularly relates to a switching signal generating apparatus, to a boost converter and to a method for generating a switching signal.

BACKGROUND

Two different supply voltages are used when driving an injector. A boost voltage is used for fast injector needle opening and a battery voltage is used for maintaining a needle position. A boost converter may be a specific circuit inside a controller, inside an ECM (Electronic Control Module) or inside an ECU (Engine Control Unit) that generates the boost voltage. The battery supplies power to the boost converter for generating the boost voltage. Limitations in electronic architecture however cause extra-power consumption when boost voltage is generated from the battery voltage. This extra-power consumption may appear because regulation of a boost voltage provided by the boost converter to the injector may not be optimized in terms of power efficiency. Moreover, for the same reason, also the accuracy of a current regulation may be degraded. This phenomenon of insufficient optimization may depend on variations of the boost voltage level and on variations of the battery voltage level. Consequently, an inadequate current regulation might drive an extra-power consumption. Current regulation is affected by variations in the boost voltage level and battery voltage level. Such variations in a voltage level may be difficult to compensate, in particular to compensate using software.

Accordingly, it is desirable to provide for an efficient boost voltage and boost current supply. In addition, it is desirable to provide for a switching signal generating apparatus that generates an effective switching signal for producing a boost voltage and/or a boost current. Furthermore, other desirable features and characteristics of the present invention will become apparent from the subsequent detailed description and the appended claims, taken in conjunction with the accompanying drawings and the foregoing technical field and background.

SUMMARY

An apparatus for generating a switching signal is provided. The switching signal generated by this apparatus may be used for driving a boost converter. In an example the apparatus may be used for any existing boost converter in order to generate a high power transfer value for that boost converter. In one embodiment, the switching signal generating apparatus includes an input terminal. The input terminal is configured to receive an electrical quantity related to an electrical current which is to be switched by the switching signal generating apparatus. In an example the signal to be switched by the disclosed apparatus may be a boost current of a boost converter. A first comparator of the switching signal generating apparatus is configured to compare the electrical quantity related to the electrical current with a predefined first fixed threshold value for determining a first logical state. Furthermore, a second comparator is configured to compare the electrical quantity related to the electrical current with a variable threshold value for determining a second logical state. An output terminal of the switching signal generating apparatus is configured to provide a switching signal which switches the electrical current between an ON state and an OFF state when the electrical quantity of the electrical current meets the variable threshold value. The first logical state and the second logical state vary the variable threshold value. In an example the first logical state and/or the second logical state is/are defined such that a logical state of high level means that the electrical quantity related to the electrical current is higher than the respective threshold value. A logical state of low level may be defined such that the electrical quantity related to the electrical current is lower than the respective threshold value.

In an example the switching signal provided at the output terminal is used to vary the variable threshold value in addition to the first logical state and the second logical state. In particular the switching signal determines which variable threshold value shall be used if there exists a plurality of variable threshold values. For instance, the switching signal determines which threshold value may be loaded in a corresponding digital analog converter (DAC).

An electrical quantity related to the electrical current may be a voltage derived from the current by a sense resistor. In this text the terms "current" and "electrical quantity related to the electrical current" or "voltage" are used similar in order to simplify the text.

A boost current may be controlled such to vary substantially only between a high threshold value and a low threshold value. A control logic used to monitor the current to reach the high threshold value may be named as "High Current control logic". A control logic used to monitor the current to reach the low threshold value may be named as "Low Current control logic". In an example of a High Current control the variable threshold value may substantially be decreased when the first logical state and the second logical state are equal and of a high level. In another example of the High Current control the variable threshold value may substantially be increased when the first logical state and the second logical state are different, in particular when the first logical state is low and the second logical state is high. Since the apparatus logic does not run if not triggered by a status level change from the above mentioned comparators the variable threshold value may substantially be left unchanged as long as the first logical state and the second logical state are equal and of a low level. Since the first comparator is used for the High Current control, i.e. where the boost current increases, the above examples may relate to the control of the High threshold value. A third comparator may be used for Low Current control and the above examples may be provided to describe the Low Current control logic in an analogue way, where the boost current is falling or decreasing.

A current to be switched may be sensed via an input terminal of the switching signal generating apparatus. Providing a first fixed threshold value and a variable threshold value or a first variable threshold value may allow for compensating an error that appears if the switching signal switches the current outside a predefined timing range. The predefined timing range may be adjusted in such a way that high energy loss is prevented. Switching outside the predefined timing range may be caused by delay introduced by signal propagation time over real physical conductors or by battery voltage variations. Such an error may be the result of physical implementation of a control algorithm. In other words, a variable threshold value may be used to adapt a real current control apparatus to a substantially ideal current control apparatus. By using a fixed and a variable threshold value the current to be switched may be controlled to remain within a predefined current range. The relationship between the fixed and variable threshold values may allow for adjusting the timing of switching a current substantially at predefined threshold values. In order to realize good switching conditions for voltage provided by a boost converter, a timing of a switch signal may be controlled in such a way that an edge of a current curve of the current to be switched substantially falls on the first fixed threshold value. The edge of a current curve may substantially meet a threshold value if threshold detection and a switching state may be synchronized. The edge of a current curve may appear substantially at the time where the switch for the current is switched between ON and OFF state. In other words, there may not exist a direct physical device that directly synchronizes the edge of the curve, i.e the fixed threshold values, and the switching state of the switch to be switched from ON to OFF and vice-versa. However, by using variable switching threshold values the timing for switching the switch may be adapted in such a way that as a result of comparing the current signal with the variable threshold values the edge of the current curve substantially lay upon the predefined threshold value.

Controlling a current curve in such a way that switching edges lay on predefined fixed threshold values may allow for a peak to peak control of the current. Peak to peak control of the current may reduce energy losses and/or power losses. In this way a peak to peak control may allow for a good energy transfer, for example a good energy transfer from a battery to an injector. A good energy transfer may be defined as an energy transfer with only small energy loss or with an energy loss close to zero. The apparatus for generating a switching signal may make a closed loop current control for a DC to DC converter independent of battery voltage variations and boost voltage variations. However, by using fixed threshold levels as switching criteria may not allow for an optimized peak to peak control.

In other words, a strategy for controlling the current without a direct synchronization to fixed threshold values may comprise using two fixed thresholds and two variable thresholds. In order to compensate delays a hysteretic control for fixed thresholds is provided. Providing variable threshold values may allow for compensating delays due to current variation caused by battery and boost voltage variations. The switching state of the switch may directly be linked to the variable threshold values.

In one example, it may be desirable to control a switch of a boost converter in such a way that the switch switches the current of the boost converter at a time when the current reaches a fixed high threshold value and/or a fixed low threshold value.

A method is provided for generating a switching signal. In one embodiment, the method includes receiving an electrical quantity related to an electrical current which is to be switched and comparing the electrical quantity related to the electrical current with a predefined first fixed threshold value or a fixed high threshold value in a first comparator for determining a first logical state. The method further includes comparing the electrical quantity related to the electrical current with a variable threshold value or a first variable threshold value in a second comparator for determining a second logical state and switching the electrical current between an ON state and an OFF state in response to a switching signal on an output terminal when the electrical quantity of the electrical current meets the variable threshold value. The first logical state and the second logical state vary the variable threshold value. In an example a closed loop control may be realized by sensing the first logical state, the second logical state and the switching signal and adjust the variable threshold value based on the sensed states and/or signals.

DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the invention disclosed herein or the application and uses of the invention disclosed herein. Furthermore, there is no intention to be bound by any principle or theory, whether expressed or implied, presented in the preceding technical field, background, summary or the following detailed description, unless explicitly recited as claimed subject matter.

Figure 1:
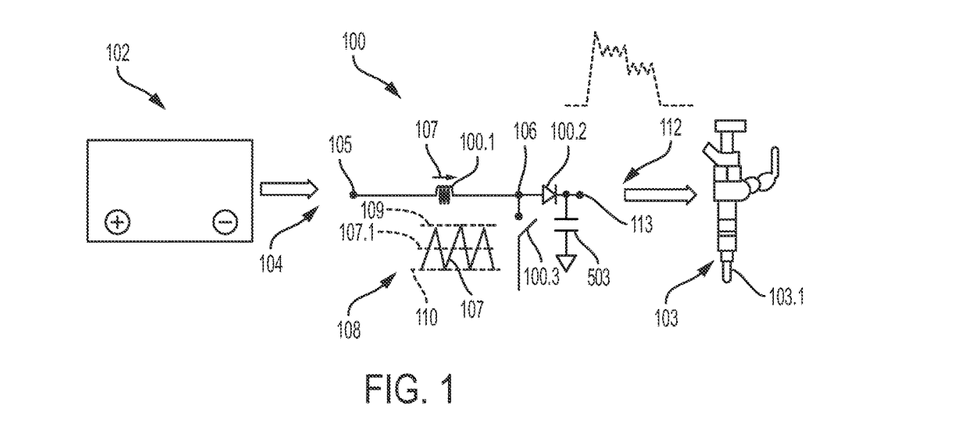
FIG. 1 is a schematic diagram of a boost converter according to an exemplary embodiment of the present disclosure.

FIG. 1 shows a schematic diagram of a boost converter according to an exemplary embodiment of the present disclosure. The battery or DC (Direct Current) source 102 is connected to a supply terminal 104 or an energy input 104 of the boost converter 100. The energy input 104 is configured for connecting a DC source 102 to the boost converter 100. In an example the DC source 102 provides the energy with a battery voltage VBatt 105. The boost converter 100 includes a coil 100.1, a diode 100.2 and a switch 100.3 and a capacitor 503. The switch 100.3 is controlled by switching signal generating apparatus 100 (not shown in FIG. 1) via a switching signal. An output terminal 112 of the boost converter 100 is connected to an injector 103. In particular, the output terminal may not be directly connected to an injector but supplies an injector control circuitry. The boost converter 100 supplies boost current 107 to the boost capacitor 503 in order to generate the respective boost voltage VBoost 113. The generated boost voltage VBoost 113 is used to drive the injector 103 and is supplied to the injector 103. The boost converter 100 generates this boost voltage 113 and boost current IBoost 107 from battery 102. The boost converter 100 may be integrated in a controller (not shown in FIG. 1). The controller also provides the battery voltage 105 to the injector 103. The battery voltage may be used for maintaining a needle position of a needle 103.1 included in the injector 103. The boost voltage 113 is used for fast injector needle 103.1 opening. In a preferred embodiment, the boost voltage VBoost 113 is higher than the battery voltage VBatt 105.

The switching element 100.3 or the switch 100.3 is connected between the coil 100.1 and the anode of the diode 100.2 at connection point 106. The boost current Iboost 107 is generated and/or controlled in coil 100.1 by switching ON and OFF the switch 100.3 according to a switching signal. The ON state is a state in that switch 100.3 is conducting and the OFF state is a state in that switch 100.3 interrupts a conduction of electrical current. The boost current 107 is provided at the output terminal 112 which is connected to the cathode of diode 100.2 and the capacitor 503 of the boost converter 100. The boost current 107 is provided at the boost voltage 113 voltage level. Therefore, the boost current 107 and boost voltage 113 determine the power and/or energy provided to the injector 103.

The schematic current diagram 108 (also known as current progression, current curve or current characteristics) shows how a boost current Iboost 107 is varied between a first fixed threshold value Iboost_high 109 and a second fixed threshold value Iboost_low 110 when the current edges are directly synchronized with the fixed threshold values. This variation keeps the boost current 107 within a range defined by the fixed threshold values and is generated by switching the switching element 100.3 between an ON state and an OFF state when the fixed threshold values are reached. As a result of switching switch element 100.3 the boost current 107 therefore varies between Iboost_low 110 and Iboost_high 109 in form of a triangular curve 107. The peaks or edges of the triangular boost current curve substantially fall on the first fixed threshold value Iboost_high 109 and the second fixed threshold value Iboost_low 110, respectively. Switching Iboost 107 between fixed threshold values 109, 110 generates a mean boost current 107.1. The mean boost current is representative of the effective power transferred to the boost capacitor 503 and then to the injector 103. At the output 112 of boost converter 100, a boost voltage Vboost 113 is generated in accordance with the boost current IBoost 107. The boost voltage Vboost 113 is provided to the injector 103 via output 112.

By generating boost voltage Vboost 113 and boost current Iboost 107 energy can be provided from energy input 104 to energy output 112. The input energy can be received at an input voltage level 105 and the output energy can be provided at an output voltage level Vboost 113. The level of the input voltage 105 or the battery voltage VBatt 105 may be lower than the level of the output voltage or boost voltage Vboost 113. The energy provided to the injector 103 is proportional to the boost current Iboost 107 and the boost voltage Vboost 113. If substantially no energy losses exist, the energy provided at energy input 104 equals the energy provided at the energy output 112. This theoretical fact of no energy losses can be written as a formula Energy_output=Energy_input.

If, however, energy losses appear, the energy provided to the injector 103 at energy output 112 is the energy provided at energy input 104 reduced by energy losses or written as a formula Energy_output=Energy_input−Energy losses.

Energy losses or power losses are proportional to a peak-to-peak current of the boost current Iboost 107. Peak-to-peak current is the current measured between high threshold value Iboost_high 109 and low threshold value Iboost_low 110 of boost current 107. Due to the fact, that delay exists between detecting threshold values of Iboost_low 110 and Iboost_high 109 and the timing of operating the switch 100.3, the edges of the boost current curve 107 may not exactly fall on the fixed threshold values 110, 109. In other words switch 100.3 may only switch after a monitoring electronic circuit detects that the boost current 107 has reached the thresholds 109, 110, respectively. Such delay however, may cause the triangular boost current Iboost 107 to exceed the limits or thresholds 109, 110 resulting in a high peak-to-peak current. A high peak-to-peak current, however, results in high power losses or energy losses and in a low efficiency of a correspondingly switched boost converter. Low efficiency can result in a high fuel consumption and in an oversize design of an ECU (Electronic Control Unit) or ECM (Electronic Control Module).

Figure 2:
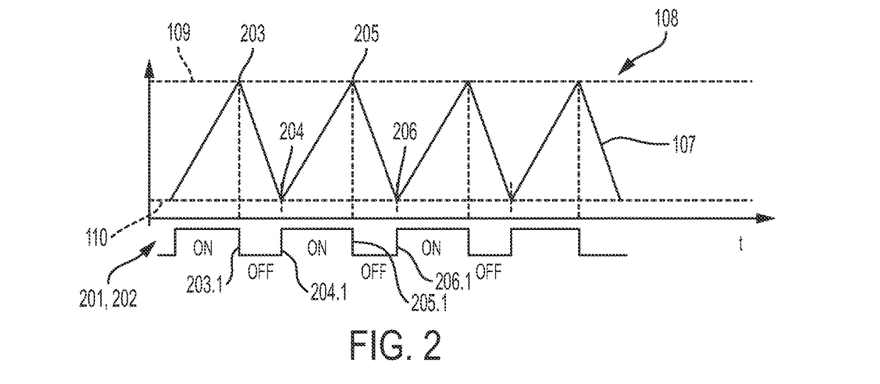
FIG. 2 is a boost current diagram for the boost converter shown in FIG. 1 for a better understanding of the present disclosure.

FIG. 2 shows the boost current diagram 108 of FIG. 1 for a case without additional energy losses from inaccurate current control for a better understanding of the present disclosure. The boost current is controlled between the two threshold values Iboost_high 109 and Iboost_low 110. The rectangular curves 201, 202 show the threshold detection curve 201 and the switch state curve 202 of switch 100.3 as progression over the time t. In this substantially delay less case threshold detection curve 201 and switch state curve 202 of switch 100.3 substantially fall together. It can be seen from FIG. 2 that in an ideal case where substantially no power and/or energy losses appear caused by an inaccurate current control, Iboost 107 switches between Iboost_high 109 and Iboost_low 110, in such a way that the peak values or edges 203, 204, 205, 206 lay on Iboost_high 109 and Iboost_low 110, respectively. Iboost_high is the highest boost current that is reached through the coil 100.1 and Iboost_low is the lowest boost current that is reached through coil 100.1 when switch 100.3 is operated in this configuration. The average value of Iboost is the mean Iboost value 107.1.

As can be seen in FIG. 2 in a case with no additional energy losses, the current threshold detection 201 and switch commutation 202 are aligned. In other words, the thresholds 109, 110 are reached at the time when the peak values 203, 204, 205, 206 are reached and substantially at the same moment of reaching the threshold values 109, 110 switch 100.3 is switched between an ON-state and an OFF-state. Consequently, slopes or flanks 203.1, 204.1, 205.1, 206.1 are aligned with reaching the threshold values. The ON state of switch 100.3 is a switching state that allows current to flow through switch 100.3. The OFF state of switch 100.3 is a switching state that blocks current flow via the switch 100.3.

Figure 3:
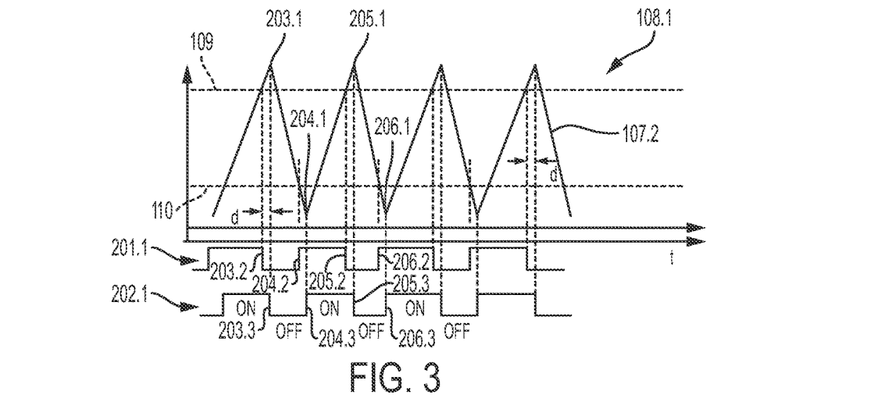
FIG. 3 is a boost current diagram for switching at fixed threshold values with delay for a better understanding of the present disclosure.

FIG. 3 shows the boost current diagram 108.1 for a case with energy loss for a better understanding of the present disclosure. In other words, FIG. 3 shows the boost current diagram 108.1 where delays d appear between threshold detection and switching state change and these delays may cause additional energy consumptions. Such a real current control which is orientated on fixed threshold values shows additional power losses from inaccurate current control.

Also, diagram 108.1 shows the fixed threshold values Iboost_high 109 and Iboost_low 110. Boost current Iboost 107.2 through coil 100.1 also has a substantially triangular shape over the time t. However, the threshold detection curve 201.1 indicating the moment of meeting the fixed threshold values Iboost_high 109, Iboost_low 110 is not aligned with the switch state curve 202.1 indicating the state of switching element 100.3. Delays d appear between meeting the threshold values and operating the switching element 100.3 resulting in edges 203.1, 204.1, 205.1, 206.1 laying outside the range 109, 110 between the fixed threshold values Iboost_high, Iboost_low. Flanks of the threshold detection curve 201.1 change when the boost current 107.2 reaches one of the fixed threshold values 109, 110. At the time when one of the fixed threshold values is detected the other fixed threshold value is used for new comparison value. However, due to the delay d between the moment 203.2, 204.2, 205.2, 206.2 of detecting boost current curve 107.2 passing threshold value 109, 110 and the moment 203.3, 204.3, 204.3 of reacting to the threshold value detection with changing the switching state are not aligned any more. The switching curve 202.1 shows the variation of the switch 100.3 between ON and OFF states and since this curve 202.1 is not aligned with detection curve 201.1 additional energy losses appear.

Figure 4:
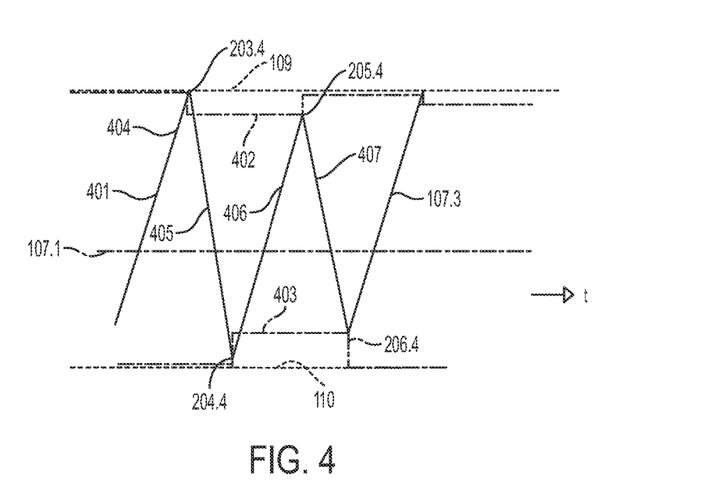
FIG. 4 is a boost current diagram showing the control strategy according to an exemplary embodiment of the present disclosure.

FIG. 4 shows a control strategy according to an exemplary embodiment of the present disclosure. This control strategy may reduce power losses in an engine control unit (ECU) and be used to set accurate setpoints in design phase. In the context of this text a setpoints may be defined as a current threshold or current threshold value which is substantially fixedly configured, e.g. Iboost_high 109 and Iboost_low 110. These, values may be set by the hardware implementation and in such a way as to satisfy the requirements of the boost control strategy which may defined by predefined Iboost_high, Iboost_low. FIG. 4 shows again a progression of a boost current 107.3 over the time t. The triangular curve 107.3 of the boost current alternates between the fixed threshold values Iboost_high 109, Iboost_low 110. Furthermore, FIG. 4 shows the mean value of Iboost 107.1. Iboost 107.1 is the average boost current provided to a load 103 such as an injector 103.

The current control strategy shown in FIG. 4 is performed by using two different current levels, i.e. fixed current levels 109, 110 or threshold values 109, 110 and variable current levels 402, 403. The diagram of boost current 107.3 starts with an increasing ramp 401. As long as switch 100.3 is in an ON state the ramp 401 converges towards an upper fixed threshold value Iboost_high 109. After switching the switch 100.3 in an OFF state the slope 405 converges towards a lower fixed threshold value Iboost_low 110. The threshold values Iboost_high 109 and Iboost_low 110 are the desired current levels that are to be met when switching the boost current 107.3 in order to reach a good peak-to-peak ratio. Switching of switch 100.3 is not aligned with reaching the fixed threshold values anymore. For adjusting the timing of switching the variable threshold values Ihigh_follower 402, Ilow_follower 403 are introduced, which are used in addition to the fixed threshold values. When basing the switching on the variable threshold values the operation of switch 100.3 is independent from the fixed threshold values. The first variable threshold value Ihigh_follower and second variable threshold value Ilow_follower both are control current levels. The amount of the variable threshold values Ihigh_follower, Ilow_follower can be varied in order to compensate the delay between threshold detection and changing switching state of boost switch 100.3. Rectangular curve 402 shows an exemplary progression of first variable threshold value or variable high follower threshold value Ihigh_follower. Rectangular curve 403 shows an exemplary progression of second variable threshold value or variable low follower threshold value Ilow_follower. The fixed threshold values Iboost_high 109 and Iboost_low 110 or desired current levels are used for verification and feedback generation. The variable threshold values or the control current threshold values Ihigh_follower 402 and Ilow_follower 403 are regulated and/or controlled using a closed loop and are used to generate the desired switching signals, the switching status command or switching state command 202.1 for the switch 100.3 of the boost converter 100. In other words, instead of using the fixed threshold values Iboost_high 109 and Iboost_low 110 for controlling switch 100.3 the flexible, adaptable and/or variable threshold values Ihigh_follower 402 and Ilow_follower 403 are used as trigger to switch switching element 100.3 between an ON and OFF state. Or in yet other words switching is synchronized to variable threshold values Ihigh_follower 402 and Ilow_follower 403 instead of fixed threshold values Iboost_high 109 and Iboost_low 110. A control or regulation strategy consists of moving the variable threshold values Ihigh_follower 402 and Ilow_follower 403 in order to maintain the boost current Iboost 107.1 in a target area between first fixed value Iboost_high 109 and second fixed value Iboost_low 110. The switching signal generating apparatus 500 of this disclosure is configured to generate an appropriate switching signal. Thus, for applying a peak-to-peak control of the boost current 107.3 the variable threshold values level Ihigh_follower and Ilow_follower are used.

With regard to switching switch 100.3 OFF an upper threshold value or a high threshold value for boost current 107.3 is monitored. On an upper end of a valid range for the boost current the high values Iboost_high 109 and Ihigh_follower 402 are used to apply the following current control strategy. This upper limit control strategy may be implemented in a high current control logic. This high current control logic may comprise a first comparator 508 providing a signal IComp_high, after comparing the boost current with the fixed threshold value Iboost_high 109 and a second comparator 514 providing a signal IComp_follower, after comparing the boost current with the variable threshold value Ihigh_follower 402. The first comparator 508 provides the IComp_high signal. The first comparator 508 compares an electrical quantity related to the electrical current or the actual current 107 with the threshold Iboost_high 109. The electrical quantity related to the electrical current may be a voltage proportional to the current derived from a sense resistor. So, the signal IComp_high is the comparator output and the signal Iboost_high 109 or Ihigh_fix 109 is one of the comparator inputs setting the fixed upper threshold value. The second comparator provides the IComp_follower signal. The second comparator compares the electrical quantity related to the electrical current or the actual current 107 with the variable upper threshold Ihigh_follower 402. So, the signal IComp_follower is the comparator output and the signal Ihigh_follower 402 is one of the comparator inputs, defining a variable threshold of the comparator.

For substantially synchronizing the change of a switching from an ON-state to an OFF-state with the moment of boost current 107.3 meeting the desired high boost current value Iboost_high 109 the variable high threshold value Ihigh_follower 402 is used as a trigger condition. When the variable high threshold value Ihigh_follower 402 is detected the switching state is changed. During an ON state of switch 100.3 the boost current increases along the slope 401, 404 of the boost current 107.3. In other words, an increasing slope 404 is monitored during switch 100.3 is in an ON-position. This increasing slope 404 is verified with the variable threshold Ihigh_follower 402. When the variable threshold value 402 is reached, switch 100.3 is switched from the ON-state to the OFF-state. If the actual boost current 107.3 exceeds the desired current Iboost_high 109 substantially at the moment of switching the switch 100.3 from ON to OFF or a little bit after that moment, the variable threshold value Ihigh_follower 402 is decreased as indicated at position 203.4 in FIG. 4. In other words, if the boost current 107.3 reaches Ihigh_follower at a time that causes the boost current to exceed Iboost_high at the moment of switching the variable value for Ihigh_follower is decreased.

The variable low threshold value Ilow_follower 403 is used as a trigger condition for substantially changing the switching state from an OFF-state to an ON-state substantially at the moment when boost current 107.3 meets the desired low boost current value Iboost_low 110 or a little bit after that moment. During an OFF state of switch 100.3 the boost current decreases along slope 405 of the boost current 107.3. In other words, a decreasing slope 405 is monitored while switch 100.3 is in an OFF-position. This decreasing slope 405 is verified with the variable threshold value Ilow_follower 403. When the variable threshold value Ilow_follower 403 is reached, switch 100.3 is changed from the OFF-state to the ON-state. If the actual boost current 107.3 at the moment of switching the switch 100.3 ON exceeds the desired current Iboost_low 110, i.e. the actual boost current 107.3 is lower than the desired current Iboost_low 110, the variable threshold value Ilow_follower 403 is increased, i.e. Ilow_follower 403 is changed in the direction towards Iboost_high 109, as indicated at position 204.4 in FIG. 4. In other words, if the boost current 107.3 reaches a variable threshold value Ilow_follower 403 at a time that causes the boost current to exceed the lower fixed threshold Iboost_low 110 the variable value for Ilow_follower 403 is increased by converging the variable threshold value Ilow_follower 403 towards the fixed high threshold value Iboost_high 109. Since threshold Iboost_low 110 is a low value exceeding of this low value means falling below that low threshold value.

For substantially changing the switching state from an ON-state to an OFF-state at the moment when boost current 107.3 meets the desired high boost current value Iboost_high 109, the variable high threshold value 402 is used as a trigger condition for changing the switching state. During an ON state of switch 100.3 the boost current increases along slope 406 of the boost current 107.3. In other words, an increasing slope 406 is monitored while switch 100.3 is in an ON-position. This increasing slope 406 is verified or compared with the variable threshold Ihigh_follower 402. When the variable threshold value is reached, switch 100.3 is switched from the ON-state to the OFF-state. If the actual boost current 107.3 substantially at the moment of switching the switch 100.3 OFF is below the desired current Iboost_high 109 the variable threshold value Ihigh_follower 402 is increased as indicated at position 205.4 in FIG. 4. In other words, if the boost current 107.3 reaches Ihigh_follower at a time that causes the boost current not to reach Iboost_high the variable value for Ihigh_follower is increased. In an example for deciding whether the variable threshold value is increased or decreased a point in time is used that may be a little bit later after switching the switch 100.3 or a point in time when the switching state is back to a steady state after switching.

For substantially changing the switching state from an OFF-state to an ON-state at the moment when boost current 107.3 meets the desired low boost current value Iboost_low 110 the variable low threshold value Ilow_follower 403 is used as a trigger condition. During an OFF state of switch 100.3 the boost current decreases along slope 407 of the boost current 107.3. In other words, a decreasing slope 405 is monitored while switch 100.3 is in an OFF-position. This decreasing slope 407 is verified with the variable threshold Ilow_follower 403. When the variable threshold value Ilow_follower 403 is reached, switch 100.3 is changed from the OFF-state to the ON-state. If the actual boost current 107.3 at the moment of switching the switch 100.3 ON is above the desired current Iboost_low 110, i.e. the actual boost current 107.3 is higher than the desired current Iboost_low 110, the variable threshold value Ilow_follower 403 is decreased, i.e. Ilow_follower 403 is changed in the direction towards Iboost_low 110, as indicated at position 206.4 in FIG. 4. In other words, if the boost current 107.3 reaches Ilow_follower 403 at a time that causes the boost current not to reach Iboost_low the variable value for Ilow_follower is decreased by converging the variable threshold value Ilow_follower 403 towards the fixed low threshold value Iboost_low 110.

In general, the current control strategy applies a peak-to-peak control using the variable current levels Ihigh_follower 402 and Ilow_follower 403. The control strategy further provides for verifying whether the boost current exceeds or lacks the fixed threshold levels Iboost_high 109 and/or Iboost_low 110. In accordance with the verification result the control strategy provides for increasing or decreasing the variable threshold values Ihigh_follower 402 and Ilow_follower 403 which are responsible to change the switching state.

Figure 5:
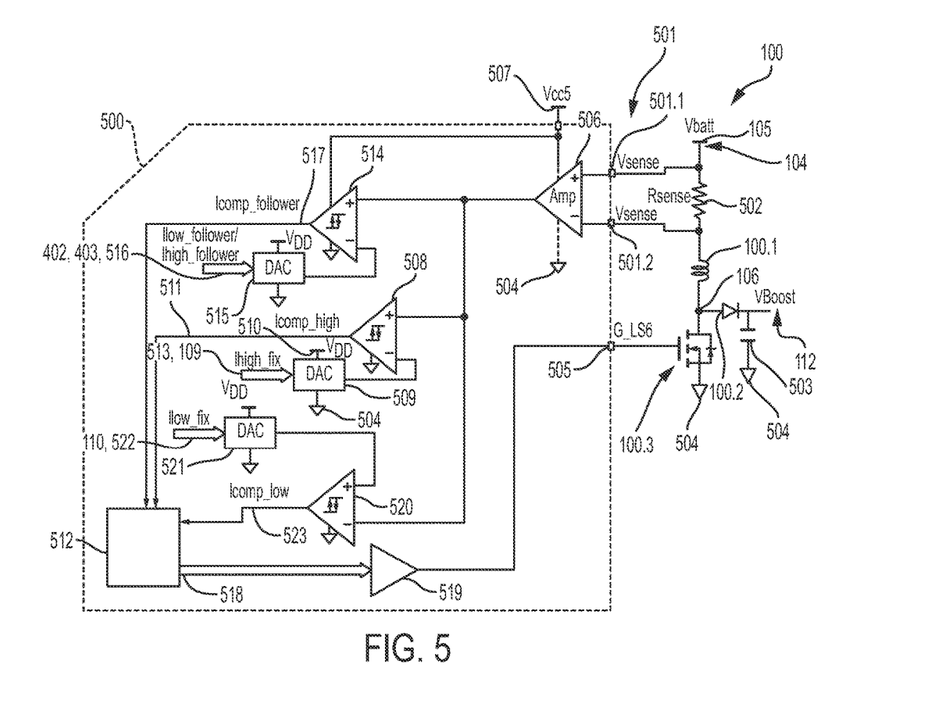
FIG. 5 is a block diagram of a switching signal generating apparatus according to an exemplary embodiment of the present disclosure

FIG. 5 shows a switching signal generating apparatus 500 according to an exemplary embodiment of the present disclosure. The boost circuit 100 or boost converter 100 receives the battery voltage VBatt 105 via the supply port 104 of the boost converter 100. A sense resistor 502 is integrated in the current path of the boost converter 100 and connected with coil 100.1. Boost coil 100.1 is connected to boost switch 100.3 at connection terminal 106. Connection terminal 106, coil 100.1 and switch 100.3 are also connected to an anode of a diode 100.2. Switch 100.3 is connected between coil 100.1 and diode 100.2. The output terminal 112 of the boost converter 100 is connected to a capacitor 503 and to a cathode of diode 100.2. Capacitor 503 is linked to a common potential such as a ground connection 504 (GND). Switch 100.3 is realized as a MOSFET transistor having a breakthrough diode. The boost voltage Vboost is provided at output terminal 112.

Boost converter 100 provides an input signal related to the boost current 107 through coil 100.1 to switching signal generating apparatus 500. The input signal comprises an electrical quantity that is related to electrical current 107 through coil 100.1. The electrical quantity may be a voltage value or a current value and is provided to switching signal generating apparatus 500 via input terminals 501, 501.1, 501.2. Switch 100.3 of the boost converter 100 is connected to the output terminal 505 of the switching signal generating apparatus 500. Boost converter 100 receives a switching signal generated by switching signal generating apparatus 500 via output terminal 505. Input terminals 501.1 and 501.2 of switching signal generating apparatus 500 are linked to sense resistor 502 of boost converter 100.

The input terminal 501 is connected to input comparator 506 or differential amplifier 506. The first port 501.1 of input terminal 501 is connected to non-inverting input of input differential amplifier 506. The second port 501.2 of input terminal 501 is connected to inverting input of input comparator 506. The comparator 506 or operational amplifier 506 is connected to a supply voltage VCC5 507 of the switching signal generating apparatus 500. The input differential amplifier 506 is also connected to the common connection 504 or ground level 504. An output of the input differential amplifier 506 is connected to the non-inverting input of first comparator 508, to the non-inverting input of second comparator 514 and to the inverting input of a third comparator 520.

The inverting input of first comparator 508 is connected to digital analog converter (DAC) 509. DAC 509 is connected to supply voltage 510 VDD and to common connection 504. DAC 509 or high DAC 515 receives a fixed threshold value Iboost_high 109 or Ihigh_fixed 109 via DAC input 513 and provides the fixed threshold value Iboost_high 109 to inverting input of first comparator 508. First comparator 508 compares the electrical quantity related to the electrical current received via input differential amplifier 506 with the predefined first fixed threshold value Iboost_high 109 for determining a first logical state Icomp_high. The first logical state Icomp_high is provided to digital logic 512 or processor 512 via output 511. Comparator 508 is responsible for monitoring the fixed high boost current threshold and generates a logical signal if the actual value of boost current 107, 107.3 received via input differential amplifier 506 exceeds the threshold value Ihigh_fix 109 or Iboost_high 109. The output signal of differential amplifier 506 is proportional to current value flowing to the sense resistance 502. The output of comparators 514, 508 and 520 are signals having a high or low level. If the actual boost current 107 and/or the electrical quantity related to current 107 exceeds Iboost_high the output signal Icomp_high is high. If the actual boost current 107 and/or the electrical quantity related to current 107 does not exceed Iboost_high the output signal Icomp_high is low.

First comparator 508 and second comparator 514 form a high current control logic.

The inverting input of second comparator 514 is connected to digital analogue converter (DAC) 515. DAC 515 is connected to supply voltage 510 VDD and to common connection 504. DAC 515 or variable DAC 515 receives a variable threshold value Ihigh_follower 402, Ilow_follower 403 via DAC input 516 and provides the variable threshold values Ihigh_follower 402, Ilow_follower 403 to inverting input of second comparator 514. Digital logic 512 is configured to determine which one of the variable threshold values Ihigh_follower 402, Ilow_follower 403 is provided or loaded on DAC input 516. For storing the values Ihigh_follower 402, Ilow_follower 403 digital logic 512 can have a register or a memory. In an example the digital logic 512 determines the state of switch 100.3 and/or the switching signal and dependent on the switching state and/or the switching signal the corresponding variable threshold value is loaded. E.g. if switch 100.3 is ON the value Ihigh_follower 402 is loaded and if switch 100.3 is OFF the value Ilow_follower 403 is loaded.

Second comparator 514 compares the electrical quantity related to the electrical current with the variable threshold value Ihigh_follower 402, Ilow_follower 403 for determining a second logical state Icomp_follower. The second logical state Icomp_follower is provided to digital logic 512 via output 517. Second comparator 514 is responsible for monitoring the variable boost current threshold and generates a logical signal if the actual value of boost current 107,107.3 received via input differential amplifier 506 exceeds the threshold value Ihigh_follower 402, Ilow_follower 403. The state of switch 100.3 determines, which of the variable threshold values Ihigh_follower 402, Ilow_follower 403 is loaded into DAC 515. If switch 100.3 is in an ON state the variable threshold value Ihigh_follower 402 is loaded into DAC 515. If switch 100.3 is in an OFF state the variable threshold value Ilow_follower 403 is loaded to DAC 515. No inversion of the input signal is necessary to differentiate Ihigh_follower 402, Ilow_follower 403 at the non-inverting input of differential amplifier 514 because the digital logic 512 will define correctly the comparator output according to the actual ON or OFF state of the switch 100.3. The switching signal provided on output terminal 505 of switching signal generating apparatus 500 determines the ON and/or OFF state of switch 100.3 and determines which value shall be loaded in the DAC. The switching signal identifies the phase of a boost current profile, a boost current progression or a boost current characteristics. In addition, the quantity of relevant variable threshold values Ihigh_follower 402, Ilow_follower 403 may be varied, for example increased and/or decreased.

With this configuration, the input terminal 501 is configured to receive an electrical quantity related to an electrical current which is to be switched by switch 100.3. Switch 100.3 is controlled by a switching signal provided on switching output 505. The first comparator 508 is configured to compare the electrical quantity related to the electrical current with a predefined first fixed threshold value provided via DAC 509, Ihigh_fix. First comparator 508 is configured to provide a first logical state on output 511. A second comparator 514 is configured to compare the electrical quantity related to the electrical current with a variable threshold value Ilow_follower, Ihigh_follower provided via DAC 515. The second comparator 514 is configured to determine a second logical state and provide the second logical state on output 517. The output terminal 505 of switching signal generating apparatus 100 is configured to provide a switching signal which switches the electrical current between an ON-state and an OFF-state when the electrical quantity of the electrical current meets the variable threshold value 402, 403. The first logical state provided on output 511, the second state provided on output 517 and the switching signal provided on output terminal 505 vary the variable threshold values 402, 403.

The digital control logic 512 has an output 518 connected to an amplifier 519. Amplifier 519 is provided to the output terminal 505 of switching signal generating apparatus 500. The output terminal 505 provides a G_LS6 signal. In this abbreviation G stands for gate, one of the terminals of the MOSFET used as switch 100.3. LS6 is a general terminology for this terminal.

Furthermore, the switching signal generating apparatus 500 includes a third comparator 520. Third comparator 520 and second comparator 514 form the low current control logic. First comparator 508 and second comparator 514 form the high current control logic.

The second comparator 514 is a single comparator for comparing the first variable threshold value and the second variable threshold value with the actual current level 107, 107.3. Dependent on the switching state of switch 100.3 the different variable threshold values Ihigh_follower, 402. Ilow_follower 403 are loaded to one input of comparator 514. In another example also two separate comparators may be used each responsible for monitoring one variable threshold value Ihigh_follower, 402. Ilow_follower 403.

The inverting input of comparator 520 is connected to the output of input differential amplifier 506. In other words, comparators 508 and 514 receive the input signal from input differential amplifier 506 on a non-inverting input whilst third comparator 520 receives the input signal on inverting input. Since first comparator 508 and third comparator 520 receive the signal of input comparator 506 on different types of ports (inverting/non-inverting) it is possible to monitor an upper threshold value and a lower threshold value, respectively. In another example the orientation of connection may be different. The connection to inverting or non-inverting pin is just a convention.

In general, the following rule applies. The comparator output is defined according to the relation of the signal on the non-inverting terminal (+) to the signal on the inverting terminal (−): If the signal on the non-inverting input (+) is higher than the signal on the inverting input (−) the output of the comparator is high. If the signal on the non-inverting input (+) is lower than the signal on the inverting input (−) the output of the comparator is low.

Figure 6A:
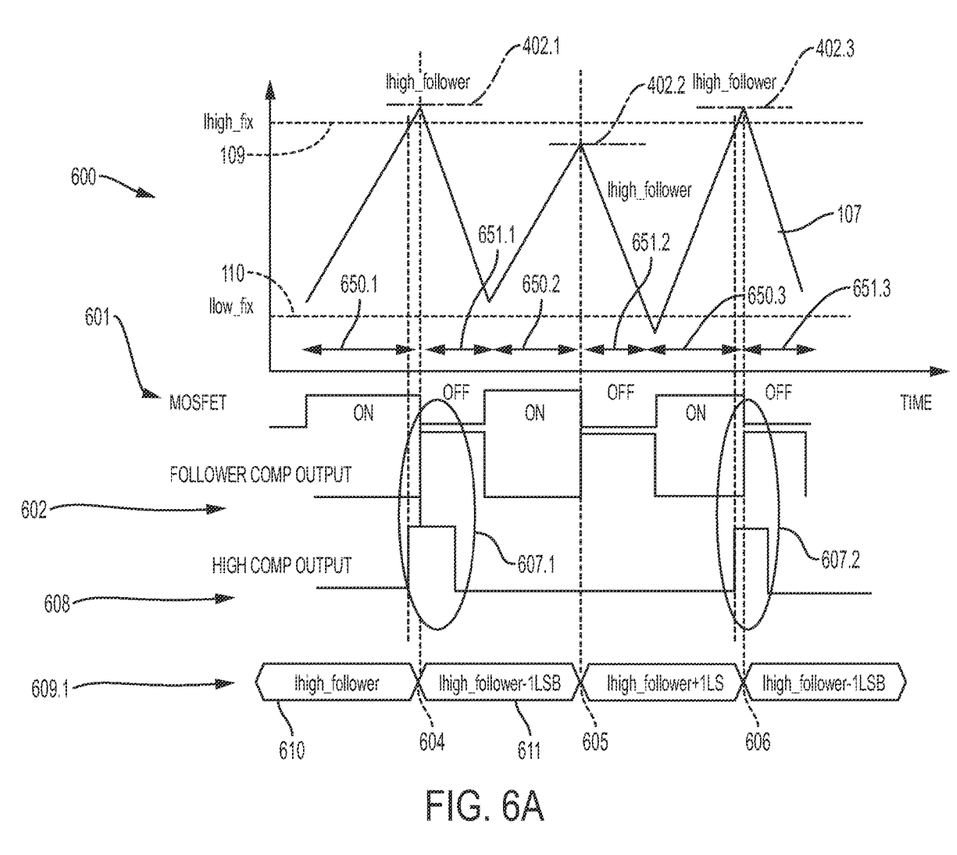
FIG. 6A shows a time diagram for a high current control logic according to an exemplary embodiment of the disclosure
Figure 6B:
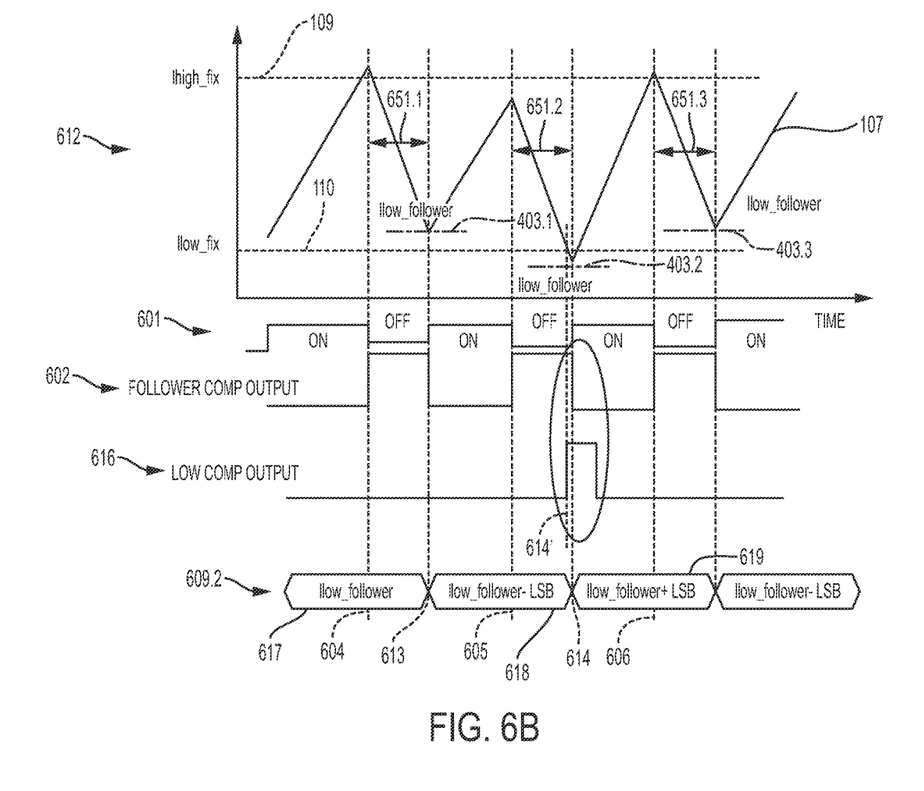
FIG. 6B is a time diagram for a low current control logic according to an exemplary embodiment of the present disclosure.

FIGS. 6A and 6B are defined according to the connection reported in diagram of FIG. 5. The non-inverting input of third comparator 520 is connected to low DAC 521. The input 522 of low DAC 521 receives the second fixed threshold value Ilow_fix, Iboost_low, 110 or low current threshold value Ilow_fix, Iboost_low, 110. The third comparator 520 is configured to compare the electrical quantity provided via the output of differential amplifier 506 which is related to the electrical boost current 107 with a predefined second fixed threshold value provided via input 522 for determining a third logical state Icomp_low. The third logical state Icomp_low is forwarded to the digital control logic 512 via output 523. The predefined second fixed threshold value Ilow_fix, 110 differs from the predefined first fixed threshold value Ihigh_fix, 109. The second comparator 514 is configured to compare the electrical quantity related to the electrical boost current with a second variable threshold value Ilow_follower if the lower threshold value is to be monitored. By comparing the boost current with the second variable threshold value Ilow_follower the second logical state Icomp_follower. is determined. The second logical state Icomp_follower together with the third logical state Icomp_low vary the second variable threshold value Ilow_follower.

In another example the first logical state Icomp_high, the second logical state Icomp_low and the switching signal provided at the output terminal 505 vary the variable threshold value Ilow_follower.

For demonstrating the control strategy FIGS. 6A and 6B show control strategies for an upper fixed threshold value and a lower fixed threshold value, respectively.

FIG. 6A shows a time diagram 600 for a high current control logic according to an exemplary embodiment of the disclosure. In particular, diagram 600 shows how the boost current 107 is controlled with regard to a high threshold level Ihigh_fix, 109 by using variable threshold values Ihigh_follower, e.g. by loading the value Ihigh_follower into DAC 515. The digital high current control logic includes first comparator 508 and second comparator 514 and uses the comparator's outputs Icomp_high 511 and Icomp_follower 517 as indicators for adjusting or varying the variable threshold value after the high current has been detected in MOSFET ON-phase 650.1, 650.2, 650.3. The states of comparator's outputs Icomp_high 511 and Icomp_follower 517 are used to increase or decrease the variable follower high threshold value Ihigh_follower during MOSFET OFF-phase 651.1, 651.2, 651.3. In other words, if a switching condition during an ON-phase is detected by boost current 107, 107.3 meeting the variable threshold value Ihigh_follower, the switch 100.3 switches to the OFF state and the output signals of first comparator and second comparator are compared. Dependent on the comparing result the value of the variable threshold value Ihigh_follower is adapted, which is responsible for monitoring the first fixed threshold value or the high threshold value Ihigh_fix. The analysis of the output signals Icomp_high 511 and Icomp_follower 517 is made during the OFF-state of switch 100.3. The OFF-state may be the state after switching from ON to OFF when the corresponding signal for detecting the OFF state is in a steady state.

The high comparator output signal 608 responsible to monitor Ihigh_fix, 109 switches before the follower output signal 602 which is responsible for monitoring the first flexible threshold value Icomp_follower 511 respectively Icomp_high. This situation is shown in FIG. 6A at 607.1. If both Icomp_high 511 and Icomp_follower 517 comparator outputs are high during MOSFET OFF-phase 651.1, 651.2, 651.3, the variable high threshold value or the variable follower high current threshold value Ihigh_follower shall be decreased. If the Icomp_follower 517 comparator output is high and Icomp_high 511 comparator output is low during MOSFET OFF-phase 651.1, 651.2, 651.3, the variable high threshold value or the variable follower high current threshold value Ihigh_follower shall be increased. The signals 602 and 608 are not aligned. High comparator output will be switched earlier than follower comparator output. The intention of diagram 600 is to show the comparator output state and the logic to move the variable threshold in a schematic way. For decreasing the Ihigh_follower value, a lowest significant bit (LSB) is subtracted from the actually valid Ihigh_follower value. The variable high threshold value 402 may be stored in a register of digital logic 512 or in ECU. The new Ihigh_follower value is the old Ihigh_follower value −1 LSB. The variable threshold value Ihigh_follower is a binary code variable of the type word stored in the digital core. In the digital core the word will be reduced or increased by 1 LSB in accordance with the comparator output. For example, if in a decimal representation the word has the value 7 in the binary system this value is 0111, wherein the quantity of bits depends on the DAC bit length. The reduced value is 1 LSB lower. In the example the reduced value is 0110 which represents the value 6 in the decimal system. In other words the corresponding value is increased or decreased by value 1. If variable follower high current threshold value Ihigh_follower 402 is decreased the value converges towards low threshold value Ilow_fix, 110 and the distance between Ihigh_follower 402 and low threshold value Ilow_fix, 110 is reduced. If the variable threshold value Ihigh_follower 402 is too far away from Ihigh_fix, 110 it is increased again. In other words, the purpose of current control strategy is to move the variable threshold across the fixed threshold. In particular, the result of the high current control is a variable threshold value Ihigh_follower 402 sliding around the first fixed threshold value Ihigh_fix, 110.

If Icomp_high and Icomp_follower comparator outputs are different during MOSFET OFF-phase 651.1, 651.2, 651.3, the variable high threshold value Ihigh_follower or the variable follower high current threshold value Ihigh_follower 402 shall be increased. For increasing the Ihigh_follower value a lowest significant bit (LSB) is added to the Ihigh_follower value, which may be stored in a register. The new Ihigh_follower value is the old Ihigh_follower value+1 LSB. If variable follower high current threshold value Ihigh_follower is increased the distance between the variable follower high current threshold value Ihigh_follower 402 and the low threshold value Ilow_fix, 110 is increased. As described above the purpose of the high current control is to slide the variable threshold value value Ihigh_follower 402 around the first fixed threshold value Ihigh_fix, 110. The addition of 1 LSB is the opposite operation as the subtraction of 1 LSB described above. For example, the decimal value 7 corresponds to the binary representation 0111, wherein the quantity of bits depend on the bit length of the DAC architecture. If this value is increased by 1 LSB the result is 1000 in the binary representation which corresponds to the decimal value 8.

In other words, diagram 601 shows the switching states of MOSFET or switching element 100.3. During an ON-state or an ON-phase 650.1, 650.2, 650.3 of switch 100.3, boost current 107 increases and during an OFF-state or an OFF-phase 651.1, 651.2, 651.3 of switch 100.3, boost current 107 decreases. Switching state diagram 601 shows that switch 100.3 is switched with regard to the variable threshold values 402.1, 402.2, 402.3. The variable threshold values Ihigh_follower define a point in time when a switch 100.3 is switched from an ON-state to an OFF-state. Diagram 602 shows a curve of output signal Icomp_follower of the second comparator 514 responsible for the variable thresholds. When the variable high threshold value 402.1, 402.2, 402.3 reaches time values 604, 605, 606, the input value of second comparator 514 via DAC 515 is changed from the actual variable high threshold value Ihigh_follower to the actual variable low threshold Ilow_follower. Monitoring the low threshold value after loading a new variable threshold value to the inverting input of second comparator 514 is described in FIG. 6B.

As can be seen in FIG. 6A, at point in time 604 when switch 100.3 is switching from ON to OFF as result of boost current 107, 107.3 reaching the variable threshold value Ihigh_follower, the output 517 of second comparator 514 is switched from a low level to a high level as shown in diagram 602 because the actual value of boost current 107 is higher than variable threshold value Ilow_follower between points in time 604 and 613, i.e. the time where switch 100.3 is in an OFF-state. Ilow_follower has been loaded to DAC 515 at the moment of switching. After switching, the comparator output remains high because first variable threshold value Ilow_follower is replaced by the new variable threshold value Ilow_follower which is loaded to DAC 515 during OFF phase and this second variable threshold value Ilow_follower is lower than the boost current 107. The logical output values of first comparator 508 are shown in the high comparator output diagram 608. Variable threshold value Ihigh_follower is stored in a register 609.1. As indicated by circles 607.1, 607.2 at the time 604, 606, the follower comparator output 517, 602 or the output 517, 602 of second comparator 514 and a high comparator output 511 or the output 511 of first comparator 508 both are high. In a case, where the logical states of high comparator output 511 of first comparator 508 and output 517 of second comparator both are high the variable high threshold value Ihigh_follower stored in register 609.1 is decreased. The initial variable high threshold value Ihigh_follower in state 610 amounts to the fixed high threshold value Ihigh_follower. During OFF-state of switch 100.3 in step 611 the register value of Ihigh_follower is decreased by one LSB (Ihigh_follower=Ihigh_follower−1 LSB). At point in time 605, the output 602 of second comparator 514 and the output 608 of first comparator 508 have different values and therefore the value for Ihigh_follower is increased during the OFF-state 651.2 of switch 100.3 (Ihigh_follower=Ihigh_follower+1 LSB).

FIG. 6B shows a time diagram 612 of boost current for a low current control logic according to an exemplary embodiment of the present disclosure. In particular FIG. 6B shows the current diagram of FIG. 6A with a focus to the low value switching. The boost current 107, 107.3 again varies between the high fix value Ihigh_fix 109 and the low fix value Ilow_fix 110 as shown in diagram 612. Diagrams 600 and 612 show substantially the same boost current 107 curve. Switching diagram 601 shows switching states of switch 100.3 or MOSFET 100.3 over time. During an ON-state 650.1, 650.2, 650.3 of switch 100.3, boost current 107 increases. During an OFF-state 651.1, 651.2, 651.3, the boost current 111 decreases. The logical state diagram 602 shows the output of second comparator 514. The logical state diagram 602 is the same diagram 602 as already provided in FIG. 6A. The content or input of/to DAC 515 can be loaded with one value selected from the variable high threshold value and the variable low threshold value dependent on the switching state of switch 100.3. The value provided on DAC input 516 of DAC 515 can be loaded from register 609.1, 609.2. The variable high threshold value Ihigh_follower, 402 is loaded if the high fixed threshold Ihigh_fix is to be met and/or if switch 100.3 is in an ON-state. The variable low threshold value Ilow_follower, 403 is loaded if the low fixed threshold Ilow_fixr is to be met and/or the switch 100.3 is in an OFF-state.

At the moment of switching switch 100.3 to an OFF state for example at time 604, the content of DAC 515 is changed from value Ihigh_follower to value Ilow_follower in order to monitor the lower threshold. The variable threshold diagram 602 shows that during time interval from time 604 to time 613 an HIGH value High-state is provided as output of variable threshold comparator 514. This HIGH value is the result of the actual current or the electrical quantity related to the actual electrical current being provided on the non-inverting input of comparator 514 and the low variable threshold value Ilow_follower on the inverting input, which has been changed from the initially loaded Ilow_follower value to Ilow_follower.

Diagram 616 shows a logical state curve of a signal provided at the output 523 of the third comparator 520 or low comparator 520. The logical state of output 523 of third comparator changes from low to high if boost current 107, 107.3 or the electrical quantity related to the boost current reaches fixed low threshold Ilow_fixr 110. At point in time 614 the "low comp output" signal 616 switches before the "follower comp output" signal 602. The "low comp output" signal 616 is the output signal of the comparator monitoring the low fixed threshold and the "follower comp output" signal 602 if loaded with the low variable threshold value is the signal of the comparator monitoring the respective variable threshold value. Consequently, the low comparator output 523, 616 will be switched earlier than follower comparator output 517, 602. FIG. 6B shows the comparator output state and the strategy for moving the variable threshold in order to generate a variable threshold sliding over the fixed threshold.

At an initial state, the value Ilow_follower 617, 403.1 from register 609.2 is provided to DAC 515. In an example, the initial value of Ilow_follower 617 is set to Ilow_fix. At time 613 when the switching state changes from OFF to ON, as can be seen in corresponding switching diagram 601, the logical signal 602 of follower comparator output 517 and the logical signal 616 of low comparator output 523 are the same and are of LOW level. Consequently, the follower low current threshold value stored in register 609.2 is decrease during the ON-state of switch 100.3. The ON-state may be the state after switching from OFF to ON when the corresponding signal for detecting the ON state is in a steady state.

For decreasing the Ilow_follower value a lowest significant bit (LSB) is subtracted from the Ihigh_follower value in step 618. The variable low threshold value Ilow_follower is stored in register 609.2. The new Ilow_follower value is the old Ilow_follower value −1 LSB. The variable threshold is a word respectively a binary code stored in the digital core 512. In the digital core the word will be reduced or increased of 1LSB in accordance with the comparator output. For example, if the word has a value of 6 in a decimal representation which corresponds to a binary value of 0110 wherein the number of bits depends on the bit length of the DAC. A reduction of 1 LSB generates a binary value of 0101 which corresponds to a value of 5 in the decimal representation. If the variable follower low current threshold value Ilow_follower is decreased, the distance between the variable follower low current threshold value Ilow_follower 403, 403.1 and the high threshold value Ihigh_fix, 109 is increased. With regard to the overall control strategy it may be an idea to not only move the variable threshold values in one direction but let the variable threshold values slide around the fixed threshold values.

The decrease of variable threshold value 403, 617 is indicated by a minus sign at the Ilow_follower value in step 618. As for example indicated at time 614, during switch 100.3, 601 is in an ON state, the logical state 602 of comparator output 517 and the logical state 616 of output 523 of third comparator 520 are different. The point in time indicates the moment 614 when the switching state of switch 100.3 changes from OFF to ON. The state of 602 and 616 are compared a little bit after switching switch 100.3 from OFF to ON, for example if logical signal 602 and 616 are in a steady state. In other words, at point in time 614' the fixed value Ilow_fix is detected. Point in time 614' lies before point in time 614 where the variable value Ilow_follower is detected. As consequence of Ilow_fix detection at time point 614', the variable threshold value Ilow_follower shall be increased by calculating Ilow_follower=Ilow_follower+1. Thus, the increase of the variable value Ilow_follower is a consequence of the commutation of signal 602 from High to Low during switch 100.3 is in the ON state and Iboost 107 increases. Consequently, the value for the variable threshold Ilow_follower is increased as indicated in step 619. The new Ilow_follower value is the old Ilow_follower value+1 LSB.

FIG. 6A and FIG. 6B show the high current control and the low current control in different diagrams to show the different control strategies for the variable threshold values Ihigh_follower and Ilow_follower. However, the input to variable comparator 514 or second comparator 514 is changed and loaded with one of the variable thresholds Ihigh_follower and Ilow_follower dependent on the switching state. The values are exchanged at the moment when the switching signal of switch 100.3 switches from ON to OFF. When the switching signal 601 switches from ON to OFF, the variable threshold value that is used to monitor the current thresholds is changed from Ihigh_follower to Ilow_follower. When the switching signal 601 changes from OFF to ON, the variable threshold value that is used to monitor the current threshold is changed from Ilow_follower to Ihigh_follower. In particular, the values that are correspondingly increased or decreased are loaded to input 516 of variable DAC 515 in order to determine one input of the second comparator 514.

The low current control logic uses the third voltage comparator 520 output Icomp_low, 616 and variable voltage comparator 514 Icomp_follower, 602 as a result of low current detection during MOSFET OFF-phase and the digital core 512 or the digital logic 512 consumes, uses and/or processes these data to increase respectively decrease the follower low threshold during MOSFET ON-phase. If both Icomp_low and Icomp_follower comparator outputs are low, the follower low current threshold shall be decreased. If Icomp_low and Icomp_follower comparator outputs are different, the follower low current threshold shall be increased.

Figure 7:
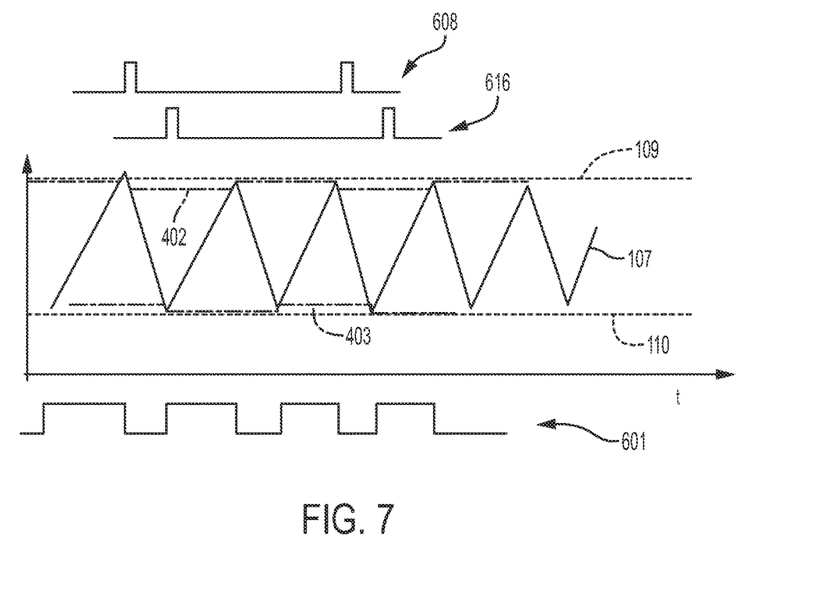
FIG. 7 are the time diagrams of the high current control strategy and the low current control strategy of FIGS. 6A and 6B drawn in one single diagram according to an exemplary embodiment of the present disclosure.

FIG. 7 shows the time diagrams of the high current control strategy and the low current control strategy of FIGS. 6A and 6B in one diagram according to an exemplary embodiment of the present disclosure. In particular, FIG. 7 shows the output signal 608 of the first comparator 508 and the output signal 616 of the third comparator 520. Both signals appear when the actual current and/or the electrical quantity related to an electrical current exceed(s) the fixed threshold values Ihigh_fix, 109 and Ilow_fix, 110, respectively. Signals 608 and 616 are the comparator output signals for comparing the actual current and the corresponding fixed thresholds 109, 110. The signal 608 is high when the actual boost current exceeds fixed high threshold Ihigh_fix 109. The signal 616 is high when actual boost current is lower than the fixed low threshold Ilow_fix 110. Also, the different states of switching signal 601 are shown in FIG. 7. The output of first comparator 508 is High or ON when the current level 107 exceeds the first fixed threshold value Ihigh_fix, 109. The output of third comparator 520 is High or ON when the current level 107 exceeds the second fixed threshold value Ilow_fix, 110, i.e. when the current level of the boost current 107 is lower than the second fixed threshold value Ilow_fix, 110.

Figure 8:
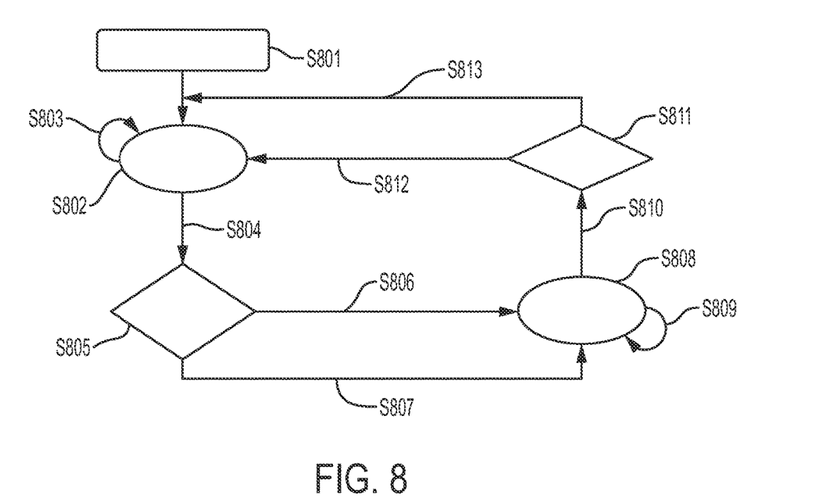
FIG. 8 is a flow chart for the high current control strategy and the low current control strategy of FIGS. 6A and 6B according to an exemplary embodiment of the present disclosure.

FIG. 8 shows a flow chart for the high current control strategy and the low current control strategy of FIGS. 6A and 6B according to an exemplary embodiment of the present disclosure. In step S801 the first and second variable threshold values Ihigh_follower, 402, Ilow_follower, 403 are set to be equal to the first and second fixed threshold values Ihigh_fix, 109 and Ilow_fix, 110, respectively, so that Ihigh_follower, 402=Ihigh_fix, 109 and Ilow_follower, 403=Ilow_fix, 110.

In step S802 the ON phase current control or high current control is executed. During ON phase S802 switch 100.3 is in an ON state and boost current 107, 107.3 increases continuously. The boost current 107, 107.3 is monitored and continuously compared to the first variable threshold value Ihigh_follower, 402 as indicated with loop S803. If in step S802 reaching of the first variable threshold value Ihigh_follower, 402 by the actual boost current 107, 107.3 is detected in step S804 the content of input to second comparator 514 is changed to the second variable threshold value Ilow_follower, 403 and switch 100.3 is switched from ON state to OFF state. In step S805 the logical state of output 511 of first comparator 508 is examined. If the logical state is High or ON, i.e. Ihigh_fix, 109 is exceeded, in step S806 the value for the first variable threshold value Ihigh_follower, 402 is decreased Ihigh_follower=Ihigh_follower −1 LSB. If the logical state is not High or not ON, in step S807 the value for the first variable threshold value Ihigh_follower, 402 is increased Ihigh_follower=Ihigh_follower+1 LSB. Thus, the first variable threshold value is always changed in step S805, either increased or decreased. The processor 512 or digital core 512 analyzes the comparator outputs and according to the algorithm it moves, varies or slides the variable threshold value Ihigh_follower.

In step S808 the OFF phase current control or low current control is executed. During OFF phase S808 switch 100.3 is in an OFF state and boost current 107, 107.3 decreases continuously. The boost current 107, 107.3 is monitored and continuously compared to the second variable threshold value Ilow_follower, 403 as indicated with loop S809. When in step S808 reaching of the second variable threshold value Ilow_follower, 403 by the actual boost current 107, 107.3 is detected in step S810 the content of input to second comparator 514 is changed to the first variable threshold value Ihigh_follower, 402 and switch 100.3 is switched from OFF state to ON state. In step S811 the logical state of output 523 of third comparator 520 or low comparator is examined. If the logical state of output 523 of third comparator 520 is High or ON, i.e. Ilow_fix, 110 is exceeded or in other words boost current 107 or electrical quantity related to the boost current is below the second fixed threshold value, in step S812 the value for the second variable threshold value Ilow_follower, 403 is increased Ilow_follower=Ilow_follower+1 LSB. If the logical state is not High or not ON, in step S813 the value for the second variable threshold value Ilow_follower, 403 is decreased Ihigh_follower=Ihigh_follower −1 LSB. The method is repeated by jumping to step S802.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

The method steps, processes, and operations described herein are not to be construed as necessarily requiring their performance in the particular order discussed or illustrated, unless specifically identified as an order of performance. It is also to be understood that additional or alternative steps may be employed.

Example embodiments are provided so that this disclosure will be thorough, and will convey the scope to those who are skilled in the art. Details may be set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies may not be described in detail.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A switching signal generating apparatus, comprising:
    an input terminal configured to receive an electrical quantity related to an electrical current which is to be switched by the switching signal generating apparatus;
    a first comparator configured to compare the electrical quantity related to the electrical current with a predefined first fixed threshold value for determining a first logical state;
    a second comparator configured to compare the electrical quantity related to the electrical current with a first variable threshold value for determining a second logical state and to compare the electrical quantity related to the electrical current with a second variable threshold value for determining the second logical state;
    a third comparator configured to compare the electrical quantity related to the electrical current with a predefined second fixed threshold value for determining a third logical state,
    wherein the predefined second fixed threshold value is different from the predefined first fixed threshold value; and
    an output terminal configured to provide a switching signal which switches the electrical current between an ON state and an OFF state when the electrical quantity of the electrical current meets the first variable threshold value;
    wherein the first logical state and the second logical state vary the first variable threshold value and the second logical state and the third logical state vary the second variable threshold value.

2. The switching signal generating apparatus of claim 1, wherein the electrical quantity related to the electrical current is one of a voltage and a current.

3. The switching signal generating apparatus of claim 1, wherein the first fixed threshold value and a propagation time determine the first variable threshold value, wherein the propagation time is the difference between the time when the electrical quantity related to the electrical current meets the first variable threshold value and the time for providing the switching signal at the output terminal.

4. The switching signal generating apparatus of claim 1, wherein the first variable threshold value lies closer to the first fixed threshold value than to the second fixed threshold value and the second variable threshold value lies closer to the second fixed threshold value than to the first fixed threshold value.

5. The switching signal generating apparatus of claim 1, wherein the second fixed threshold value and a propagation time determine the second variable threshold value, wherein the propagation time is the difference between the time when the electrical quantity related to the electrical current meets the second variable threshold value and the time for providing the switching signal at the output terminal.

6. The switching signal generating apparatus of claim 1, further comprising a controller in communication with at least one of an output of the first comparator, an output of the second comparator, an output of the third comparator and the output terminal.

7. The switching signal generating apparatus of claim 6, wherein the controller is configured to selectively load at least one of the first variable threshold value and the second variable threshold value to the second comparator.

8. The switching signal generating apparatus of claim 6, wherein the controller is configured to decrease the first variable threshold value when both the output of the first comparator and the output of the second comparator have a logical high state and the switching signal is in the ON state.

9. The switching signal generating apparatus of claim 6, wherein the controller is configured to increase the first variable threshold value when the output of the first comparator and the output of the second comparator have a different logical state and the switching signal is in the ON state.

10. The switching signal generating apparatus of claim 6, wherein the controller is configured to increase the second variable threshold value when both the output of the second comparator and the output of the third comparator have a logical low state and the switching signal is in the OFF state.

11. The switching signal generating apparatus of claim 6, wherein the controller is configured to decrease the second variable threshold value when the output of the second comparator and the output of the third comparator have a different logical state and the switching signal is in the OFF state.

12. The switching signal generating apparatus of claim 6, wherein the controller is configured to:
decrease the first variable threshold value when both the output of the first comparator and the output of the second comparator have a logical high state and the switching signal is in the ON state;
increase the first variable threshold value when the output of the first comparator and the output of the second comparator have a different logical state and the switching signal is in the ON state;
increase the second variable threshold value when both the output of the second comparator and the output of the third comparator have a logical low state and the switching signal is in the OFF state; and
decrease the second variable threshold value when the output of the second comparator and the output of the third comparator have a different logical state and the switching signal is in the OFF state.

13. The switching signal generating apparatus of claim 1, wherein an output of the first comparator indicates a deviation that is to be reduced by varying at least one of the first variable threshold value and the second variable threshold value.

14. A boost converter comprising the switching signal generating apparatus of claim 1 and a switch in communication with a current conductor, wherein the input terminal of the switching signal generating apparatus is in communication with the current conductor and receives an electrical quantity related to the current flowing through the current conductor and the output terminal of the switching signal generating apparatus is in communication with the switch.

15. A method for generating a switching signal, comprising:
receiving an electrical quantity related to an electrical current which is to be switched;
comparing the electrical quantity related to the electrical current with a predefined first fixed threshold value in a first comparator for determining a first logical state;
comparing the electrical quantity related to the electrical current with a first variable threshold value in a second comparator for determining a second logical state;
comparing the electrical quantity related to the electrical current with a predefined second fixed threshold value for determining a third logical state, wherein the predefined second fixed threshold value is different from the predefined first fixed threshold value;
comparing the electrical quantity related to the electrical current with a second variable threshold value for determining the second logical state; and
switching the electrical current between an ON state and an OFF state in response to a switching signal on an output terminal when the electrical quantity of the electrical current meets the first variable threshold value;
wherein the first logical state and the second logical state vary the first variable threshold value; and wherein the third logical state and the second logical state vary the second variable threshold value.

16. A non-transitory computer readable medium, comprising software code, which when executed by a processor, is configured to:
receive an electrical quantity related to an electrical current which is to be switched by the switching generating apparatus;
compare the electrical quantity related to the electrical current with a predefined first fixed threshold value in a first comparator for determining a first logical state;
compare the electrical quantity related to the electrical current with a first variable threshold value in a second comparator for determining a second logical state
compare the electrical quantity related to the electrical current with a predefined second fixed threshold value for determining a third logical state, wherein the predefined second fixed threshold value is different from the predefined first fixed threshold value;
compare the electrical quantity related to the electrical current with a second variable threshold value for determining the second logical state; and
switch the electrical current between an ON state and an OFF state in response to a switching signal on an output terminal when the electrical quantity of the electrical current meets the first variable threshold value;
wherein the first logical state and the second logical state vary the first variable threshold value; and wherein the third logical state and the second logical state vary the second variable threshold value.

17. A switching signal generating apparatus, comprising:
an input terminal configured to receive an electrical quantity related to an electrical current which is to be switched by the switching signal generating apparatus;
a first comparator configured to compare the electrical quantity related to the electrical current with a predefined first fixed threshold value for determining a first logical state;
a second comparator configured to compare the electrical quantity related to the electrical current with a first variable threshold value for determining a second logical state and to compare the electrical quantity related to the electrical current with a second variable threshold value for determining the second logical state;
a third comparator configured to compare the electrical quantity related to the electrical current with a predefined second fixed threshold value for determining a third logical state,
wherein the predefined second fixed threshold value is different from the predefined first fixed threshold value and wherein the first variable threshold value lies closer to the first fixed threshold value than to the second fixed threshold value and the second variable threshold value lies closer to the second fixed threshold value than to the first fixed threshold value; and
an output terminal configured to provide a switching signal which switches the electrical current between an ON state and an OFF state when the electrical quantity of the electrical current meets the first variable threshold value; and
wherein the first logical state and the second logical state vary the first variable threshold value; and wherein the second logical state and the third logical state vary the second variable threshold value.

* * * * *